T. SPENCER.
CONSTANT VOLTAGE SYSTEM.
APPLICATION FILED DEC. 1, 1913.
1,220,370.
Patented Mar. 27, 1917.
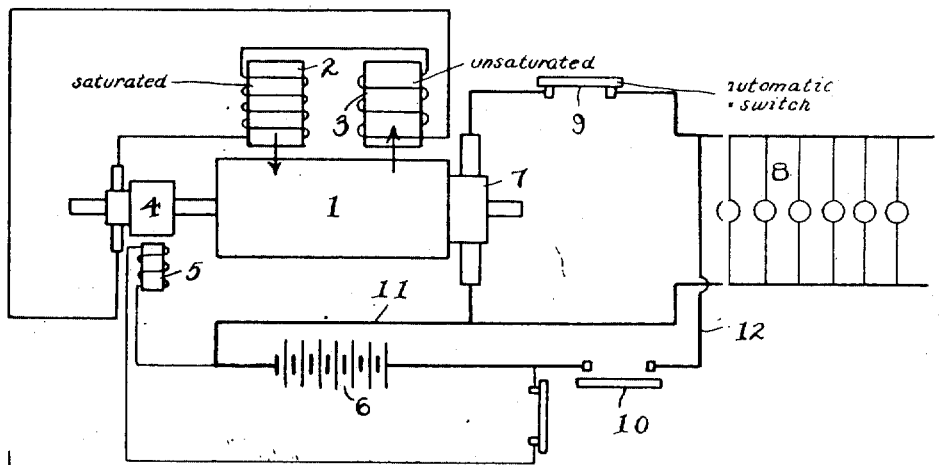
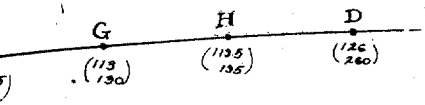
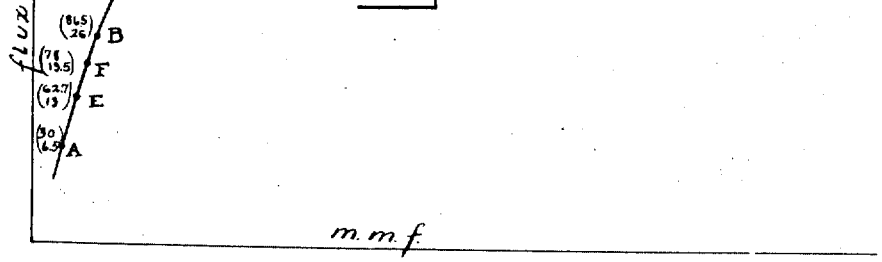
WITNESSES:
D. Brewer.
H. G. Grover
INVENTOR
THOMAS SPENCER
BY Ira J. Adams.
ATTORNEY

UNITED STATES PATENT OFFICE.

THOMAS SPENCER, OF PHILADELPHIA, PENNSYLVANIA, ASSIGNOR TO HELIOS MANUFACTURING COMPANY, OF PHILADELPHIA, PENNSYLVANIA, A CORPORATION OF PENNSYLVANIA.

CONSTANT-VOLTAGE SYSTEM.

1,220,370.     Specification of Letters Patent.     Patented Mar. 27, 1917.

Application filed December 1, 1913. Serial No. 803,899.

*To all whom it may concern:*

Be it known that I, THOMAS SPENCER, a citizen of the United States, residing at Philadelphia, in the county of Philadelphia and State of Pennsylvania, have invented a certain new and useful Improvement in Constant-Voltage Systems, of which the following is a full, clear, and exact description.

This invention relates to a constant voltage system with varying speed of the prime mover. It is primarily intended for car lighting but can be used advantageously wherever the speed of the prime mover varies to a considerable extent. The invention will be described with reference to a car lighting system, but only by way of example.

An ideal car lighting system should, without any adjustments whatever give constant unidirectional voltage at all speeds between wide limits, regardless of the direction in which the car is moving. The object of my invention is to accomplish this result.

The voltage developed in a generator armature follows the well known law, $$(1) \quad V = kBN$$

where B is the field strength, N the speed of the armature, and $k$ a constant. If by some means the field flux can be made to vary inversely as the speed, the voltage induced would be constant. That is, if $$B = \frac{k'}{N}$$

the above equation would reduce to, $$(2) \quad V = kk'$$

It will now be shown, how this relation can be obtained by the inherent action of the generator itself without any resistance regulation or other adjustment.

Figure 1 is a conventional illustration of the constant voltage system in accordance with my invention.

Fig. 2 illustrates graphically the relations between field strength and magneto motive force.

In Fig. 1 the armature 1 of the generator is acted on by two opposed fields 2 and 3, the one being saturated, the other being unsaturated. These fields are excited from a generator 4 whose speed of rotation is proportional to that of the armature 1 and which preferably is directly connected to the armature shaft as shown. The fields 2 and 3 can be connected either in series or in parallel, the series connection being preferable. The field 5 of the exciter 4 is energized from some source of constant E. M. F. 6, preferably a storage battery. The commutator 7 of the main generator 1 is connected to the lights 8 or other translating devices directly through the usual automatic switch 9 which is preferably located within the casing of the generator. A switch 10 and the two leads 11 and 12 permit the charging of the storage battery from the generator terminals whenever necessary. This may be accomplished automatically or otherwise, but as it forms no part of my invention, it has not been illustrated on the drawing.

The saturated field 2 predominates over the unsaturated field 3 and the latter by its opposition causes a resultant field to be produced that can be proven to vary inversely as the speed of rotation of the main armature. In the arrangement shown, the voltage of the exciter 4 varies directly as the speed of rotation of the armature 1 since the strength of its field 5 is always constant. The ampere turns on the fields 2 and 3 will therefore vary directly with the speed of rotation of the main generator armature. Since the direction of the field 5 is always the same, the direction of the terminal voltage of the exciter 4 reverses every time the direction of rotation is reversed. The current through the coils on fields 2 and 3 being reversed whenever the direction of rotation of armature 1 is reversed, the terminal voltage of the main generator will therefore be unidirectional regardless of the direction in which the car is moving. It will thus be seen that one of the requirements of the previously mentioned ideal car lighting system is fulfilled by the system described. It will now be proven that the terminal voltage of the system shown is independent of the speed.

In Fig. 2 a magnetization curve is shown in which the ordinates represent field flux per unit area and the abscissas magnetomotive force or ampere turns per unit of length, as is well known. It was pointed out a long time ago by Lamont and Frölich that such a curve is substantially an equilateral hyperbola represented by the equation $$(3) \quad y = \frac{ax}{1+bx}$$

where $x$ is the magnetizing force which may be expressed in ampere turns per unit length, $y$ the flux per unit area and $a$ and $b$ are constants. While this equation can be made to coincide with any magnetic curve by properly choosing the constants $a$ and $b$, it is of such a form as not to lend itself to the demonstration of the theory of my invention. Any given portion of the magnetization curve however, can be represented by the following equation $$(4) \quad y = c - \frac{d}{x}$$

where $c$ and $d$ are constants and $y$ and $x$ field strength and ampere turns respectively. By choosing certain values for $c$ and $d$, this curve closely follows any given portion of the magnetization curve, that is if equation (4) represents that portion of the curve between A and B of Fig. 2, then by choosing other constants, the equation $$(5) \quad y' = c' - \frac{d'}{x'}$$

will represent that portion of the curve between the points C and D.

Returning to the system shown in Fig. 1, the field 3 is to be so wound and proportioned that it will work between the limits AB of the magnetization curve while field 3 will be designed to work between limits CD. It is the usual practice to use storage batteries for the lights when the cars are standing still or traveling below or above certain limits of speed, the upper and lower limits being usually 20 and 80 miles per hour respectively. It is therefore obvious that the points A and B on the one hand and C and D on the other represent the cutting in and cutting out speeds respectively.

Let $x'$ represent the ampere turns on the field 3 for the point A, and $fx'$ the ampere turns for the same field at the point B. If the generator is cut in at 20 miles an hour and cut out at 80 miles an hour, it is obvious that the constant $f$ is equal to 4. Let it be assumed that the ampere turns on field 2 at the cutting in point C are $m$ times as great as the ampere turns on field 3 at cutting in point A. Therefore the ampere turns on field 2 at the cutting out point D will be $m$ times as great as those on field 3 at cutting out point B, that is the ampere turns will be $mfx'$ at this point. With the ampere turns on the two fields thus related, each point on the curve CD will be $m$ times as great as some point on the curve AB.

Taking the previously assumed values for the magneto-motive forces on the two fields, the equation for that portion of the curve between A and B is represented by equation (4), and the equation for that portion of the curve between points C and D will be, $$(6) \quad y' = c' - \frac{d'}{mx}$$

If equation (4) be multiplied by some constant $k$ and subtracted from equation (6), the following will result, $$(7) \quad y' - ky = (c' - kc) + \left(kd - \frac{d'}{m}\right)\frac{1}{x}$$

Since $k$ is an assumed constant, it is evident that it can be made to have any value desired. It will, therefore, be assumed that $$k = \frac{c'}{c}$$

and by substituting this value in equation (7), the following is obtained $$(8) \quad y' - ky = \left(kd - \frac{d'}{m}\right)\frac{1}{x}$$

the terms $c$ and $c'$ having disappeared.

Since $k$, $d$, $d'$ and $m$ are all constants and since $y' - ky$ is the resultant field acting on the main generator armature, the equation reduces to $$Y' = \frac{k}{x}$$

showing that in the described arrangement the resultant field varies inversely as the speed, the ampere turns $x$ being proportional to the speed.

The constant $k$ by which the equation of the unsaturated field 3 is multiplied merely indicates that the core section of this field is $k$ times the core section of the other field.

The accuracy of the theory depends, of course, on the closeness with which the equations represent the portions of the magnetization curve chosen, but since the slight error in each portion is in the same direction, the variations of the two fields to a certain extent cancel each other and thus eliminate the small error which thereby causes a much closer agreement than the fundamental equations with the real saturation curve.

To show the practical application of this theory, a magnetization curve for cast steel given by S. P. Thompson in his dyanmo design will be taken as a typical curve. Taking from this curve the abscissa for the point A as 6.5, the ordinate will be 30,000 lines. The abscissas of point B will be $f$ times this or 26 ($f$ being previously chosen as 4) and the ordinate for this point as taken from the curve is 86,500. Since the abscissa of point C is $m$ times that of point A, and arbitrarily choosing the value of $m$ as 10, the abscissa of C will be 65, while the ordinate taken from the curve will be 105,500.

Since the abscissa of point D is $m$ times that of point B, it will be equal to 260, and the ordinate taken from the curve will be 126,000. In Fig. 2 of the drawing and in the calculations further on, the values of the ordinates have all been divided by 1,000 for convenience.

Since the equation for that portion of the curve between A and B holds for all the points, the values of the constants $c$ and $d$ can be found by substituting in the equation the values of the coördinates at points A and B. It will then be found that $c=105.3$ and $d=489.7$. Since equation (6) holds for all points on the portion CD, the values of $c'$ and $d'$ can be found by substituting the values of the coördinates of C and D in the equation. It will then be found that $c'=132.8$ and $d'=1776.6$. Since $$k = \frac{c'}{c}$$

its value will be 1.261. That is, the field strength of the unsaturated field 3 can be multiplied by factor $k$ by making its core section 1.261 times that of saturated field 2.

Taking four arbitrary points on the curve corresponding to the speed of 20 miles, 40 miles, 60 miles and 80 miles, the abscissas of the two intermediate points E and F on the curve for the unsaturated field will be 13 and 19.5 respectively, and the ordinates taken from the Thompson curve for such values of magneto motive force will be 62.7 and 78 respectively. In like manner the abscissas for the two intermediate points G and H on the curve for the saturated field will be 130 and 195 respectively while the ordinates taken from such magneto motive force values on the Thompson curve will be 113 and 119.5 respectively. With the coördinates of the two limiting speeds and the two intermediate speeds being thus established for both curves, the values of the resultant field acting on the armature at each of the four points will be determined from the equations and also from flux values taken directly from the Thompson curve to show how close the agreement is.

The value of the resultant field as derived from equation 8 for the four speeds 20, 40, 60 and 80 miles will be 67.67, 33.83, 22.55, 16.92 respectively. Now using flux values from the Thompson curve and subtracting the field flux 30 at the point A multiplied by the area factor, 1.261 from the field flux 105.5 at the point C and doing likewise for each of the other speeds, 40, 60 and 80 miles per hour, the resultant field for each of the four points is 67.67, 33.94, 21.14 and 16.92 respectively. It will thus be seen that the equation is very close to being correct for all points chosen. This means that the voltage can be maintained substantially constant at all speeds between the assumed speeds of 20 and 80 miles an hour without any regulation whatever.

It will be understood that the limiting speeds 20 and 80 miles per hour are used only by way of example. The invention can of course, be used with systems having other cutting-in and cutting-out speeds. However, the further apart the limiting speeds are, the more tendency there will be for the intermediate speeds to vary somewhat from the constant value.

Hysteresis can have no appreciable effect on the operation as a metal can be chosen that has negligible hysteretic properties. An instance of such is cast steel which is usually used in field cores for train lighting generators especially.

Armature reaction due to the load can be overcome in my invention in the same manner as in other systems by the use of appropriate interpoles as well as by other arrangements.

In Fig. 2 of the drawing, no attempt has been made to have the curve drawn to scale as it is illustrative only. The coördinates of the eight points are taken from the Thompson curve and are not scaled off from Fig. 2.

Fig. 1 is merely a conventional showing of the system and it will be understood that in practice the fields 2 and 3 will each consist of one or more pairs of poles, the number being immaterial as far as the invention is concerned.

Having described my invention, what I claim is:

1. In a generating system, the combination of an armature with a saturated field core adapted to send flux through the commutated coils in one direction, an unsaturated field core adapted to send field flux simultaneously through the said coils in the opposite direction, said cores having substantially similar magnetization curves, and means adapted to produce in each core a magneto motive force proportional to the speed of the armature.

2. In a generating system, the combination of a rotatable armature with a saturated field core, a second unsaturated field core, said cores having substantially similar magnetization curves, the flux from said cores adapted to induce opposed E. M. F.'s simultaneously in the same coils of said armature, field coils on each core, and an exciter, having a constant field, connected to said armature to rotate therewith and electrically connected to said coils to saturate one core and undersaturate the other.

3. In a generating system the combination of a rotatable armature with a saturated field core, a second unsaturated field core, said cores having substantially similar magnetization curves, the flux from said cores adapted to induce opposed E. M. F.'s simultaneously in the same coil of said armature, field coils on each core, a generator having a constant field and an armature connected to rotate with the first armature and electrically connected to said coils to saturate the said first core, and undersaturate the second core, the total flux of said second core being less than that of the first.

4. In a generating system, the combination of a rotatable armature with a saturated field core, a second unsaturated field core, said cores having substantially similar magnetization curves, the flux from said cores adapted to induce opposed E. M. F.'s simultaneously in the same coil of said armature, field coils on each core, a second armature connected to rotate with the first armature, a field core therefor, means to produce a substantially constant flux in said third field core, said second armature being electrically connected in series with said field coils to saturate the first field core and undersaturate the second with a lesser flux.

In testimony whereof, I hereto affix my signature.

THOMAS SPENCER.

Witnesses:
C. W. GULDEN,
HERMAN T. GRUNINGER.